INVENTOR
GIANNI A. DOTTO
BY
ATTORNEY

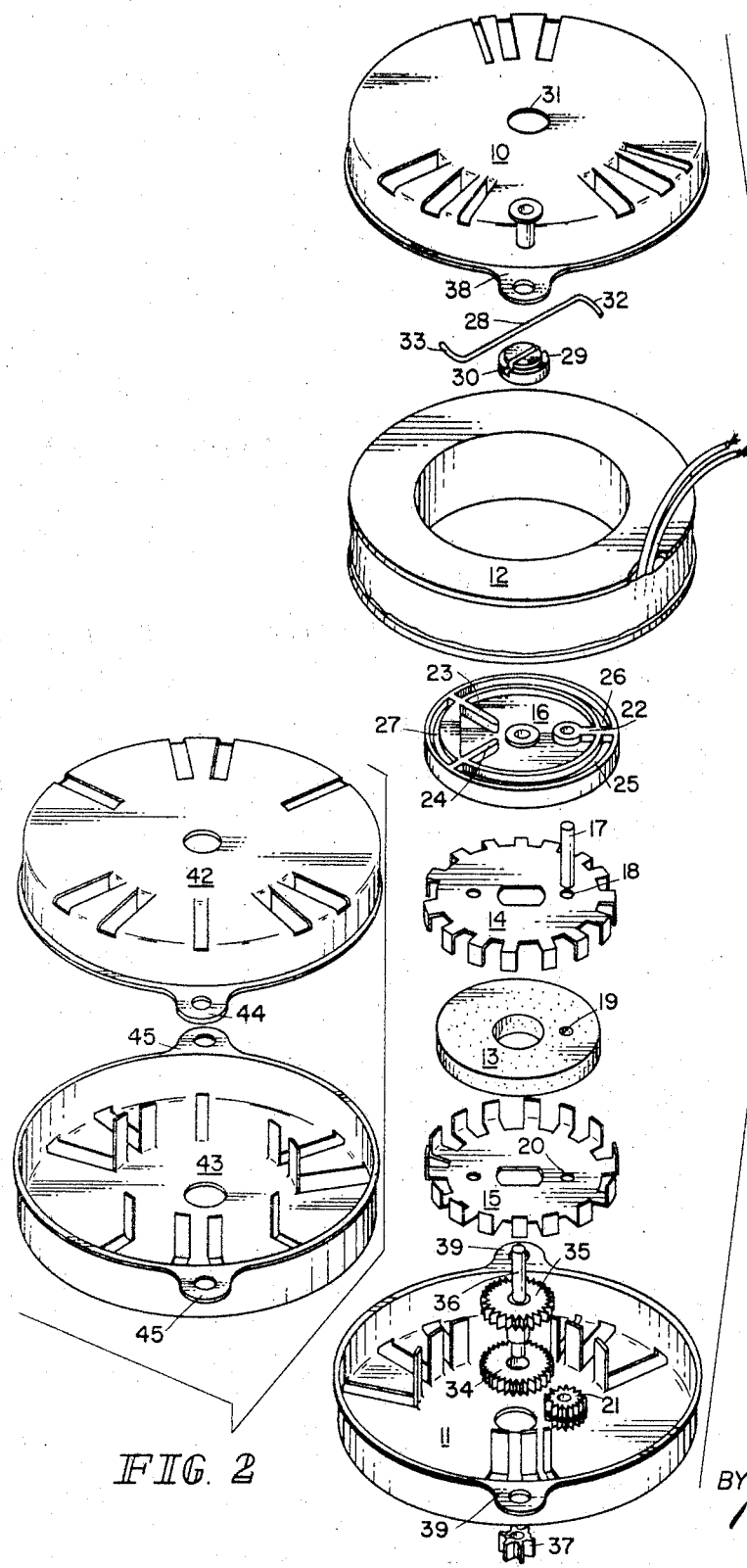

Feb. 11, 1969   G. A. DOTTO   3,427,485
SYNCHRONOUS MOTOR
Filed Feb. 23, 1966   Sheet 3 of 3
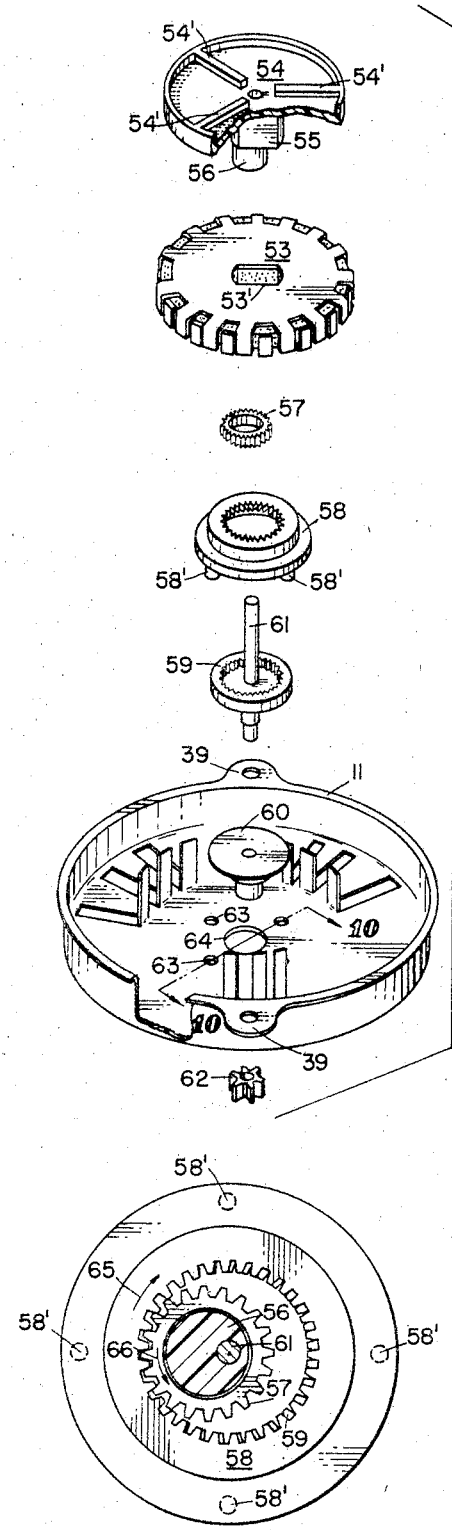
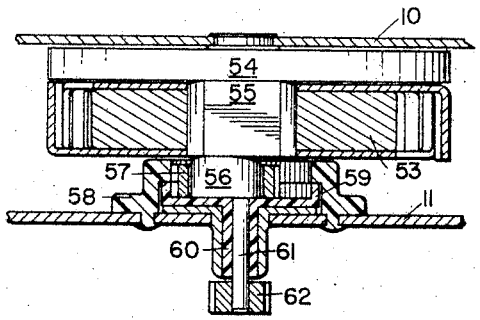
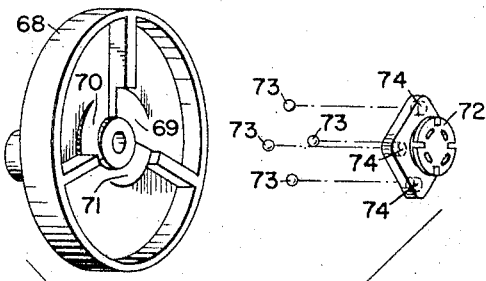
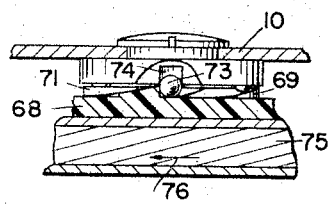
INVENTOR
GIANNI A. DOTTO
BY
ATTORNEY

3,427,485
SYNCHRONOUS MOTOR

Gianni A. Dotto, Dayton, Ohio, assignor to P. R. Mallory & Co. Inc., Indianapolis, Ind., a corporation of Delaware
Filed Feb. 23, 1966, Ser. No. 529,333
U.S. Cl. 310—164        28 Claims
Int. Cl. H02k *19/02, 21/02*

ABSTRACT OF THE DISCLOSURE

A self-starting synchronous motor including a plurality of stator pole groups projecting into an aperture of a field coil and adjacent the poles of the rotor of the synchronous motor. Each of the stator pole groups including at least two poles with at least one of said poles being less than the width of the other stator poles in the group.

---

The present invention relates to synchronous motors and more particularly to the means and methods for providing a synchronous motor having a novel structure.

There are a multitude of applications for small synchronous motors of the type having a permanent magnet rotor. Many of these applications are in timing devices such as clocks and automatic washer time sequence switches. In the future, these timing devices will have to be made smaller than present-day timing devices. Hence, the synchronous timing motors will have to be made smaller.

Accordingly, the present invention is a synchronous motor which is reduced in size as compared to contemporary synchronous motors having equivalent output shaft speeds and torques.

One feature of the motor of the present invention is that the rotor, one-way directional device, and speed reduction means are entirely contained within the space circumscribed by the field coil. The stator poles are formed out of two identical metallic shells which are mated together to form a housing for the motor.

The aforementioned one-way directional device is required because synchronous motors of the type having permanent magnet rotors will run in either direction when current is applied. Two novel and practical one-way directional devices for the motor of the present invention are presented in this specification.

A speed reduction means for coupling the rotor to the output shaft of the motor is required because rotors of synchronous motors rotate at greater speeds and produce less torque than is required for most timing applications. The speed reduction means of the motor of the present invention has fewer moving parts and is more efficient than contemporary gear and pinion systems used in synchronous timing motors. This feature is accomplished by having only two moving gear elements in the speed reduction means. Since there are only two moving gear elements, friction losses are reduced.

Many synchronous motors of the type having permanent magnet rotors will not always start when current is applied under certain conditions. Usually, this malfunction is caused by an equilibrium condition between the forces tending to rotate the rotor in one direction and equal and opposing forces tending to rotate the rotor in the opposite direction. The probability of such an occurrence is greatly increased if the magnetic structure is symmetrical. Any asymmetry, such as various gaps between rotor and stator poles, various pitches between the rotor poles, various permanent magnet irregularities, etc., all enhance the probability of the motor starting when current is applied. However, the problem is to create an asymmetrical condition which will always start the motor but which will not impair the running characteristics of the motor. Accordingly, there is presented in this specification a stator field arrangement which will assure that the motor starts but which will not appreciably reduce the running torque.

Other features of the motor of the present invention will become apparent as this specification progresses.

It is an object of the present invention, therefore, to provide a small synchronous motor having starting and running characteristics equal to that of larger motors.

It is another object of the present invention to provide a synchronous motor having a novel and efficient speed reduction means entirely enclosed within the area circumscribed by the field coil of said motor.

It is a further object of the present invention to provide a synchronous motor having a novel and efficient one-way directional means for assuring proper rotation of the rotor.

It is still another object of the present invention to provide a synchronous motor having stator poles disposed so as to create an unbalanced magnetic field for starting said motor.

It is still a further object of the present invention to provide a synchronous motor having a housing formed out of two identical shells, each of said shells having a portion of the stator poles for said motor integrally formed thereon.

It is yet another object of the present invention to provide a synchronous motor having the desirable characteristics of compactness, self-starting, low output speed, and high output torque which can be inexpensively manufactured.

The present invention, in another of its aspects, relates to novel features of the instrumentalities described herein for teaching the principal object of the invention and to the novel principles employed in the instrumentalities whether or not these features and principles may be used in the said object and/or in the said field.

Other objects of the invention and the nature thereof will become apparent from the following description considered in conjunction with the accompanying drawings and wherein like reference numbers describe elements of similar function therein and wherein the scope of the invention is determined rather from the dependent claims.

For illustrative purposes, the invention will be described in conjunction with the accompanying drawings in which:

FIGURE 1 is an exploded perspective view of one complete embodiment of the motor of the present invention.

FIGURE 2 is an exploded perspective view of an alternate pair of housing shells for the motor of the present invention.

FIGURE 8 is an exploded perspective view of an embodiment of the present invention illustrating an internal gear reduction means.

FIGURE 9 is a fragmentary view illustrating the operation of the internal gear reduction means of the present invention.

FIGURE 10 is a sectional view 10—10 taken from FIGURE 8 to illustrate further the operation of the internal gear reduction means of the present invention.

FIGURE 11 is an exploded perspective view of an alternate one-way directional device for the motor of the present invention.

FIGURE 12 is a sectional view illustrating the operation of the one-way device shown in FIGURE 11.

Figure 3:
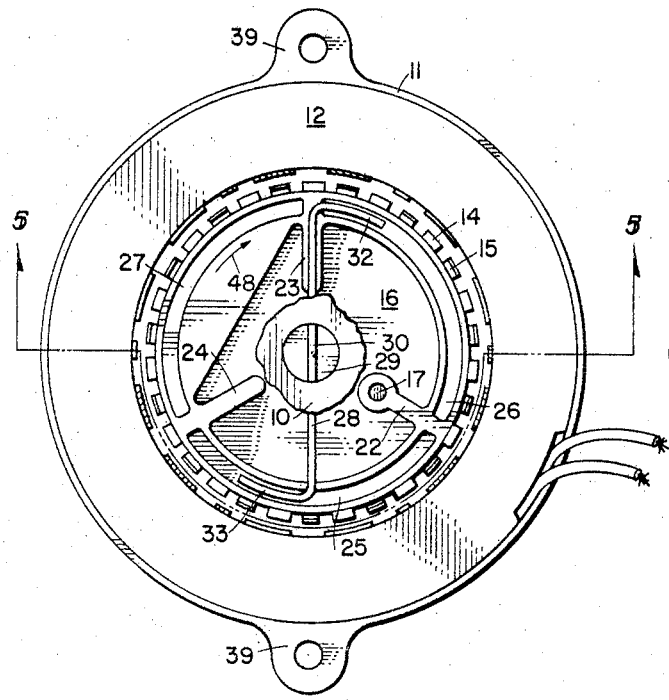
FIGURE 3 is a view of the motor of the present invention with the top shell removed to expose the field coil, rotor assembly, and one-way directional means.

Generally speaking, the present invention is a synchronous motor comprising: a metallic housing formed by a pair of oppositely disposed cylindrically shaped shells having a substantially flat closed end and an open end, each of said shells having a plurality of radially-shaped pole pieces lanced out of said flat closed end and extending towards said open end so as to mate with pole pieces of the opposing shell, thereby forming a circle of stator poles; a field coil annularly disposed in said housing in the space between said stator poles and the external walls of said cylindrically shaped shells; a permanent magnet rotor having a plurality of salient poles about the periphery thereof, said rotor being rotatably mounted within said housing so as to provide a uniform air gap between said salient poles of said rotor and said stator poles; a one-way directional means for said rotor, said one-way directional means including a rotating member affixed to said rotor and a restraining member affixed to said housing; and a speed reduction means for coupling said rotor to an output shaft of said motor, said speed reduction means being entirely disposed within the area circumscribed by said field coil, said speed reduction means including a first gear staked to said housing, a second gear having a different number of teeth than said first gear fixably mounted on said output shaft, said output shaft being concentric with said first gear, and a pinion gear engaged with said first gear and said second gear so as to cause said second gear to rotate with respect to said first gear when said rotor is rotated.

More generally, the present invention is a synchronous motor comprising: a metallic housing formed by a pair of oppositely disposed cylindrically shaped shells having a closed end and an open end, each of said shells having a plurality of radially-spaced pole pieces lanced out of said closed end and extending towards said open end so as to mate with pole pieces of the opposing shell, thereby forming a circle of stator poles; a field coil annularly disposed in said housing in the space between said stator poles and the external walls of said cylindrically shaped shells; a permanent magnet rotor having a plurality of salient poles about the periphery thereof, said rotor being rotatably mounted within said housing so as to provide a uniform air gap between said salient poles of said rotor and said stator poles; a means for assuring that said rotor rotates in a predetermined direction, said means including a rotating member affixed to said rotor and a restraining member affixed to said housing; and a speed reduction means for coupling said rotor to an output shaft of said motor, said speed reduction means being entirely disposed within the area circumscribed by said field coil.

Referring now to the drawing, and particularly to the exploded perspective of FIGURE 1, the component parts of the present invention can be visualized in conjunction with the following description.

The motor of the present invention is retained in the top shell 10 and the bottom shell 11 which are held together to form a housing. The material for the shells 10 and 11 may be ordinary cold-rolled steel, preferably annealed. Integral poles are formed by lancing radial strips out of the flat portions of the shells and forming them parallel to the center axis so as to extend above the rim of the shell.

The dimensions of the two shells 10 and 11 depend, of course, on the characteristics of the motor which is being constructed. For illustrative purposes, a specific motor will be described in the specification. The shells 10 and 11 of the illustrative embodiment are approximately 2 inches in diameter and one-quarter inch deep. The integral poles are formed with a radius of approximately five-eighths of an inch and extend approximately one-eighth of an inch above the rim of the shell.

The poles that are formed in the shells constitute stator field poles for the motor of the present invention. In the illustrative embodiment, the poles are spaced apart in the following relationship. Viewing the shell 11 so that the poles are pointing upward and proceeding clockwise, pole #1 is at 0 degrees and is double width, pole #2 is at 24 degrees and is double width, pole #3 is at 42 degrees and is single width, pole #4 is at 120 degrees and is double width, pole #5 is at 144 degrees and is double width, pole #6 is at 162 degrees and is single width, pole #7 is at 240 degrees and is double width, pole #8 is at 264 degrees and is double width, and pole #9 is at 282 degrees and is single width. The shell 10 poles will have the same angular positions when viewed so that the poles are pointing up and proceeding counter clockwise. When the two shells 10 and 11 are mounted face to face, the single width poles will occupy the space adjacent to each pair of double width poles on the opposite shell.

The purpose of staggering the positioning and varying the width of the poles is to create an unbalanced field which will always cause the motor to start. An optional stator pole arrangement will be discussed in conjunction with FIGURE 2.

It can readily be seen that the stator pole arrangement of FIGURE 1 will provide better starting torque characteristics than the stator pole arrangement of FIGURE 2. However, the stator pole arrangement of FIGURE 2 will provide higher running torque characteristics than the stator pole arrangement of FIGURE 1.

A coil 12 consisting of an insulating spool wound with a predetermined number of turns of wire is annularly disposed in the space between the ID of the shells 10 and 11 and the intermeshed ring of stator poles. In the illustrative embodiment, which is described in detail in this specification, the coil 12 has approximately 5000 turns of 40 AWG enameled copper wire terminated by insulated stranded wire as shown in FIGURE 1.

The rotor of the motor of the present invention is comprised of a permanent magnet disc 13 sandwiched between two spiders 14 and 15. Each of the two spiders 14 and 15 have integral legs formed parallel to the center axis of the spiders so as to intermesh alternately with the legs of the opposite spider. The spiders can be formed of ordinary cold-rolled steel, preferably annealed. The permanent magnet disc 13 is magnetized so that one face is north and the opposite face is south. Thus, the spider legs are magnetized correspondingly so that the periphery of the rotor contains a predetermined number of salient poles magnetized alternately north and south.

In the illustrative embodiment of the present invention, each of the spiders 14 and 15 have fifteen legs. Thus, the rotor has 30 salient poles magnetized alternately north and south.

The assembly consisting of the two spiders 14 and 15 and the permanent magnet disc 13 is pressed over a plastic D-shaped shaft on the member 16 which is part of a one-way directional device and the rotor bearing. There is a shaft 17 which extends through the hole 18 in the spider 14, the hole 19 in the permanent magnet disc 13, and the hole 20 in the spider 15. The pinion gear 21 is rotatably mounted on the shaft 17.

The top face of the member 16 is recessed so as to form three equally-spaced radial ribs 22, 23 and 24 extending from the OD towards the center but terminating before reaching the center. There are also three equally-spaced tracks 25, 26 and 27 formed about the edge of the member 16. The purpose of the ribs 22, 23 and 24 and the tracks 25, 26 and 27 is to form a portion of a one-way directional device consisting of the member 16, the Z-shaped wire 28 and the bushing 29. The Z-shaped wire 28 is trapped in the slot 30 of the bushing 29 and the bushing is staked in the hole 31 of the top shell 10. One end 32 of the Z-shaped wire is formed at a slight angle to the plane formed by the center portion and the end 33 so that the ends of said Z-shaped wire will butt against the sides of the radial ribs 22, 23 and 24 when the rotor is turning in one direction but will ramp over said ribs when the rotor turns in the opposite direction. The ends 32 and 33 of the Z-shaped wire 28 ride in the tracks 25, 26 and 27 formed in the member 16.

Since the illustrative embodiment of the present invention has 15 pairs of rotor poles, it will turn at 240 r.p.m. when a 60-c.p.s. current is applied to the coil 12. In order to reduce this speed, an economical and novel gear reduction means has been developed. The gear reduction means is comprised of the pinion gear 21 which is rotatably mounted on the shaft 17, a gear 34 which is staked to the shell 11 with the center axis of the gear 34 in line with the center axis of said shell, the gear 35 which is mounted on the shaft 35 so as to impart rotation thereto, and the pinion gear 37 which is mounted on the shaft 36 so as to be rotated thereby. The gear 35 has one tooth more or less than the gear 34 which is staked to the shell 11. The pinion gear 21 is intermeshed with both of the gears 34 and 35 so as to advance the gear 35 with respect to the gear 34 when the motor is energized. The operation of the pinion gear 21 and the gears 34 and 35 is similar to that of a planetary gear system. Since the gear 35 has one tooth more or one less than the gear 34, the shaft 36, which is fixed to the gear 35, will turn an amount equal to the reciprocal of the number of teeth on the staked gear 34 for each revolution of the pinion gear 21 about the staked gear.

It can be seen that the gear reduction means for the motor of the present invention is contained in the opening of the field coil 12 of the motor. It can also be seen that great speed reductions can be obtained merely by using a pinion gear, a staked gear, and a moveable gear with the gear reduction means of the present invention. Thus, a tremendous savings of space is obtained over that required for motors having similar output requirements. For example, the illustrative embodiment of this invention, which is approximately 2 inches in diameter and one-half inch thick, has an output speed of 8 r.p.m. and an output shaft torque of 16 in.-oz. for an input of 115 volts, 60 c.p.s. The torque output of the rotor for an input of 115 volts, 60 c.p.s. is between 1 and 1.2 in.-oz.

The tabs 38 on the shell 10 are designed to mate with the tabs 39 on the shell 11 and provide a means for holding the two shells 10 and 11 together so as to form a housing for the motor of the present invention.

Referring now to FIGURE 2, an alternate configuration for the stator poles can be discussed.

As was the case with the shells 10 and 11 shown in FIGURE 1, the top shell 42 and the bottom shell 43 have stator poles formed integrally therein by lancing radial strips out of the flat portions of the shells and forming them parallel to the center axis of said shells. Also, the poles are spaced apart in multiples of 12 degrees. Viewing the shell 43 so that the poles are pointing upward and proceding clockwise, pole #1 is at 0 degrees and is single width, pole #2 is at 48 degrees and is double width, pole #3 is at 72 degrees and is double width, pole #4 is at 120 degrees and is single width, pole #5 is at 168 degrees and is double width, pole #6 is at 192 degrees and is double width, pole #7 is at 240 degrees and is single width, pole #8 is at 288 degrees and is double width, and pole #9 is at 312 degrees and is double width. The poles on the shell 42 will have the same angular position when viewed with the poles extending up and proceding counter-clockwise. When the shells 42 and 43 are mounted face to face, the single width poles will occupy the space between each pair of double width poles.

The tabs 44 on the top shell 42 are designed to mate with the tabs 45 on the bottom shell 43 and are a means for holding the two shells together so as to form a housing.

Referring now to FIGURE 3 a view of the motor of the present invention, with the top shell 10 mostly cut away can be discussed. The bottom shell is illustrated in this view to show the stator pole relationship discussed in conjunction with FIGURE 1.

As the rotor of the motor turns in the direction of the arrow 48 the ends 32 and 33 of the Z-shaped wire 28 will run freely in the tracks 25, 26 and 27 and are ramped over the ribs 22, 23 and 24. If the rotor turns in a direction opposite to the arrow 48, the ends 32 and 33 will butt against the ribs 22, 23 and 24 to stop the rotation.

It can be seen in FIGURE 3 that there is a single width stator pole equally spaced between each pair of double width stator poles which are equally spaced about the stator adjacent to the field coil 12.

Figure 4:
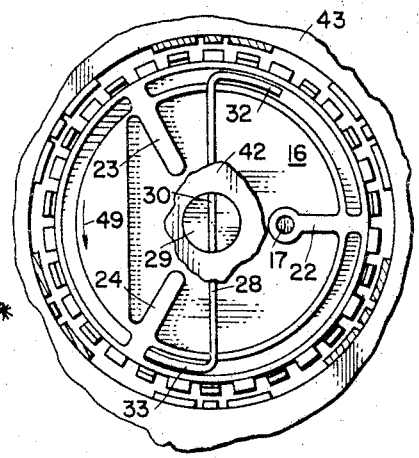
FIGURE 4 is a fragmentary view of the motor of the present invention illustrating further the operation of the one-way directional device.

Referring now to FIGURE 4, another view of the motor with the top shell 42 mostly cut away can be discussed. The bottom shell 43 is shown in FIGURE 4 to illustrate the stator pole relationship discussed in conjunction with FIGURE 2.

If the rotor rotates in the direction of the arrow 49, the ends 32 and 33 will butt against the ribs 22, 23 and 24. It can be seen in FIGURE 4 that the end 33 is butting against the rib 24 to stop the rotation of the rotor.

It can also be seen in FIGURE 4 that there is a single width stator pole located between each pair of double width stator poles adjacent to the field coil 12.

Figure 5:
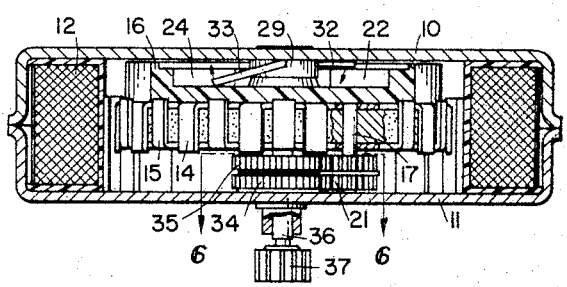
FIGURE 5 is a sectional view 5—5 taken from FIGURE 3 showing the relationship of the field coil, top and bottom housing shells, rotor, one-way directional device, and gear reduction means.

Referring now to FIGURE 5, a sectional view 5—5 taken from FIGURE 3 can be discussed.

The sectional view 5—5 is provided to show the structural arrangement of the stator coil 12, the rotor comprised of the spiders 14 and 15 and the permanent magnet disc 13, the gear reduction means comprised of the pinion gear 21, staked gear 34, and the gear 35, and the one-way directional device comprised of the Z-shaped wire 28 and the ribs 22, 23 and 24. It can be seen in FIGURE 5, that the one-way directional device, rotor, and gear reduction means are all located within the field coil 12. Thus, the motor of the present invention is a very compact motor having a flat cylindrical shape with a minimum number of moving parts for providing a low speed output. The pinion gear 37 on the output shaft 36 is a means for coupling the motor to a driven device.

Figure 6:
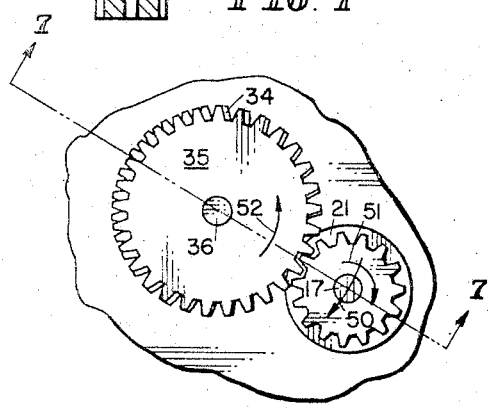
FIGURE 6 is a sectional view 6—6 taken from FIGURE 5 to illustrate the operation of the gear reduction means for one embodiment of the present invention.

Referring now to FIGURE 6, a view further illustrating the operation of the pinon gear 21, staked gear 34 and gear 35 can be discussed.

As the rotor of the motor rotates in the direction of the arrow 50, the pinion gear 21 will rotate in the direction of the arrow 51 and will rotate about the gears 34 and 35 in the direction of the arrow 50. Since the gear 34 is staked to the bottom shell 11 and since the gear 35 has one more tooth than the gear 34, the planetary action of the pinion gear 21 about the gears 34 and 35 will cause the gear 35 to rotate in the direction of the arrow 52. (If the gear 35 has one tooth less than the gear 34, the gear 35 will rotate in a direction opposite to the arrow 52.)

Figure 7:
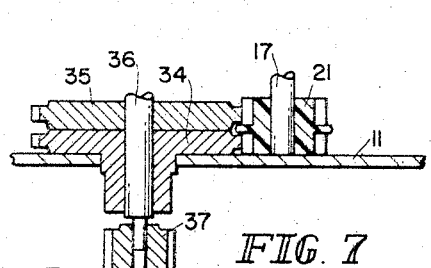
FIGURE 7 is a sectional view 7—7 taken from FIGURE 6 to illustrate further the operation of the gear reduction means shown in FIGURE 6.

Referring now to FIGURE 7, it can be seen that the pinion gear 21 is intermeshed with both of the gears 34 and 35 and that the gear 34 is staked to the shell 11.

Referring now to FIGURE 8, an alternate gear reduction means for the motor of the present invention can be discussed. The major difference between this gear reduction means and the one initially described is that this one utilizes internal teeth in lieu of external teeth. The internal teeth gear reduction means provides significantly less drag for the motor and takes up significantly less room.

The rotor 53 is a sandwich of a permanent magnet disc and two spiders as previously described. A member 54 having a double-D shaft 55 is pressed against the rotor 53 so that the double-D shaft 55 of said member is pressed into the double-D opening 53′ in said rotor. There are 3 ribs 54′ equally spaced about the member 54 to serve as stops for a one-way directional device such as the Z-shaped wire 28 previously described.

The pinion gear 57 is freely mounted on the eccentric shaft 56. The protruding portions 58′ of the gear 58 are staked into the holes 63 in the shell 11. The gear 59 is mounted on the shaft 61 so as to impart rotation thereto. There is a bushing 60 which provides a bearing surface in the hole 64 in the shell 11. The gear 59, which has one more or one less teeth than the gear 58, is trapped between the shell 11 and the gear 58 but is free to rotate.

Referring now to FIGURE 9, a view showing the operation of the pinion gear 57 and the gears 58 and 59 can be discussed.

As the rotor 53 rotates, the pinion gear 57, which is freely mounted on the eccentiric shaft 56 and engaged with both of the gears 58 and 59, will rotate about the interior of the gears 58 and 59 in the direction of the arrow 65. The pinion gear 57 will rotate about the eccentric shaft 56 in the direction of the arrow 66.

Since the gear 59 has one more or one less tooth than the gear 58, the gear 59 will rotate one tooth-space with respect to the gear 58 for each revolution of the rotor.

Referring now to the sectional view 10—10 taken from FIGURE 8, it can be seen that the rotor 53 and gear reduction means comprised of the gears 58 and 59 and the pinion gear 57 are disposed between the two shells 10 and 11 of the motor housing. It can also be seen that the frictional surfaces of the gear reduction means are sufficiently close to the center of the output shaft 61 so as to not provide an appreciable drag on the motor. The pinion gear 62 is provided as a means for coupling the motor to a driven device.

Referring now to FIGURE 11, an alternate one-way directional device for the motor of the present invention can be discussed.

The member 68 is mounted on the rotor of the motor so as to be rotated thereby. There are three ramping surfaces 69, 70 and 71 formed on the member 68. Axially aligned with the member 68 is the member 72 which is fabricated of a suitable nonmagnetic material. There are four axially aligned holes in the member 72 which open towards the member 68. A ball 73 formed of suitable magnetic material is placed in each of the holes 74. The member 72 is designed to be fixed to the top shell 10 of the housing for the motor.

Referring now to FIGURE 12, a view further illustrating the operation of the one-way directional device of FIGURE 11 can be discussed.

The balls 73 are attracted out of the holes 74 towards the member 68 by the permanent magnet rotor 75. Thus, when the rotor 75 is rotated in the direction of the arrow 76, the balls will be ramped back into the holes 74 by the ramping surfaces 69, 70 and 71. If the rotor 75 is rotated in a direction opposite to the arrow 76, the balls 73 will prevent the rotation by wedging between the side of the holes 74 and the vertical portion of the ramping surfaces 69, 70 and 71.

Although the illustrative embodiment of FIGURE 11 shows 4 balls and three ramping surfaces, it is obvious that different combinations can be worked out within the framework of this disclosure.

The synchronous motor of the present invention, as hereinbefore described in several embodiments, is merely illustrative and not exhaustive in scope. Since many widely different embodiments of the invention may be made without departing from the scope thereof, it is intended that all matter contained in the above description and shown in the accompanying drawing shall be interposed as illustrative and not in a limiting sense.

What is claimed is:

1. A synchronous motor comprising: a metallic housing formed by a pair of oppositely disposed cylindrically shaped shells having a substantially flat closed end and an open end, each of said shells having a plurality of radially-spaced pole pieces lanced out of said flat closed end and extending towards said open end so as to mate with pole pieces of the opposing shell, thereby forming a circle of stator poles, said stator poles are radially disposed so as to create an unbalanced magnetic field for starting said synchronous motor; a field coil annularly disposed in said housing in the space between said stator poles and the external walls of said cylindrically shaped shells; a permanent magnet rotor having a plurality of salient poles about the periphery thereof, said rotor being rotatably mounted within said housing so as to provide a uniform air gap between said salient poles of said rotor and said stator poles; a one-way directional means for said rotor, said one-way directional means including a rotating member affixed to said rotor and a restraining member affixed to said housing; and a speed reduction means for coupling said rotor to an output shaft of said motor, said speed reduction means being entirely disposed within the area circumscribed by said field coil, said speed reduction means including a first gear staked to said housing, a second gear having a different number of teeth than said first gear fixably mounted on said output shaft, said output shaft being concentric with said first gear, and a pinion gear engaged with said first gear and said second gear so as to cause said second gear to rotate with respect to said first gear when said rotor is rotated.

2. A synchronous motor as in claim 1 wherein said one-way directional means comprises: a rotating member having a plurality of radially spaced ribs formed thereon, said rotating member being affixed to said rotor; a substantially Z-shaped wire having a first and second end portion and a straight center portion, said first end portion being bent slightly with respect to a plane defined by said second end portion and said center portion; and a means for holding said center portion to said housing so that said end portions will interfere with said ribs when said rotor is rotated in the wrong direction and so that said end portion will be ramped up when said rotor rotates the right direction.

3. A synchronous motor as in claim 1 wherein said one-way directional means comprises: a rotating member having a plurality of ramping surfaces formed thereon, said rotating member being affixed to said rotor; a member constructed of nonmagnetic material affixed to said housing and having a plurality of cylindrically shaped cutouts opening towards said ramping surfaces; and a ferrous metal ball disposed within each of said cutouts so as to be attracted towards said permanent magnet rotor, said balls being ramped back into said cutouts by said ramping surfaces when said rotor is rotating in the right direction and being wedged between said ramping surfaces and said cutouts when said rotor is rotating in the wrong direction.

4. A synchronous motor as in claim 1 wherein said second gear has one more tooth than said first gear so as to provide a speed reduction equal to the reciprocal of the number of teeth of said first gear.

5. A synchronous motor as in claim 1 wherein said first gear and said second gear have external teeth and said pinion gear is rotatably mounted on a shaft affixed to said rotor so as to rotate about said first and second gears in a planetary manner, thereby causing said second gear to rotate with respect to said first gear.

6. A synchronous motor as in claim 1 wherein said first gear and said second gear have internal teeth and said pinion gear is rotatably mounted on an eccentric shaft of said rotor so as to rotate within said first and said second gear, thereby causing said second gear to rotate with respect to said first gear.

7. A synchronous motor as in claim 1 wherein said stator poles are radially disposed in groups of double width and single width poles, each of said groups having a single width pole radially disposed from said group so as to create an unbalanced magnetic field for starting said synchronous motor.

8. A synchronous motor as in claim 1 wherein each of said shells have a plurality of radially-spaced pole pieces lanced out of said flat closed end and extending towards said open end so as to intermesh with poles of the opposing shell, thereby forming a circle of stator poles.

9. A synchronous motor as in claim 1 wherein said shells are formed so that said pole pieces on a first of said shells are grouped in a clockwise relationship and said pole pieces on a second of said shells are grouped in a counter clockwise relationship.

10. A synchronous motor comprising: a metallic housing formed by a pair of oppositely disposed cylindrically shaped shells having a closed end and an open end, each of said shells having a plurality of radially-spaced pole pieces lanced out of said closed end and extending towards said open end so as to mate with pole pieces of the opposing shell thereby forming a circle of stator poles; a field coil annularly disposed in said housing in the space between said stator poles and the external walls of said cylindrically shaped shells; a permanent magnet rotor having a plurality of salient poles about the periphery thereof, said rotor being rotatably mounted within said housing so as to provide a uniform air gap between said salient poles of said rotor and said stator poles; a means for assuring that said rotor rotates in a predetermined direction, said means including a rotating member affixed to said rotor and a restraining member affixed to said housing; and a speed reduction means for coupling said rotor to an output shaft of said motor, said speed reduction means being entirely disposed within the area circumscribed by said field coil and including a first gear staked to said housing, a second gear having a different number of teeth than said first gear fixably mounted on said output shaft, said output shaft being concentric with said first gear, and a pinion gear engaged with said first gear and said second gear so as to cause said second gear to rotate with respect to said first gear when said rotor is rotated.

11. A self-starting synchronous motor comprising
an apertured field coil,
a permanent magnet rotor positioned in said aperture of said field coil, a plurality of poles about the periphery of the permanent magnet, alternate ones of said poles being of said one polarity and the remaining poles being of the opposite polarity, and
a plurality of stator pole groups projecting into said aperture of said field coil and adjacent said poles of said rotor, each of said stator pole groups including at least two poles, the width of at least one of said poles being less than the width of the other stator poles in said group.

12. The self-starting synchronous motor of claim 11, wherein said stator pole groups are substantially equally spaced from adjacent stator pole groups.

13. The self-starting synchronous motor of claim 12, wherein each of said stator pole groups include at least three stator poles.

14. The self-starting synchronous motor of claim 11, wherein the arcuate width of at least one of said poles of each of said stator pole groups being substantially less than the arcuate width of the remaining stator poles of each of said pole groups.

15. The self-starting synchronous motor of claim 14, wherein the arcuate width of said one stator pole of each of said stator pole groups is about one-half the arcuate width of said remaining stator poles of each of said stator pole groups.

16. The self-starting synchronous motor of claim 15, wherein each one-half width stator pole is separated by at least two stator poles having an arcuate width about twice that of said one-half stator pole.

17. The self-starting synchronous motor of claim 16, wherein the arcuate angle from the midpoint of a one-half width stator pole to the midpoint of an adjacent full width stator pole is less than the arcuate angle from the midpoint of a full width stator pole to an adjacent full width stator pole.

18. The self-starting synchronous motor of claim 17, wherein the arcuate angle from the midpoint of a one-half width stator pole to the midpoint of said adjacent full width stator pole is about 18 degrees and the arcuate angle from the midpoint of said full width stator pole to said adjacent full width stator pole is about 24 degrees.

19. The self-starting synchronous motor of claim 18, wherein said stator pole groups are positioned in about 60-degree sectors about said periphery of said rotor.

20. The self-starting synchronous motor of claim 19, wherein at least one more rotor pole of one polarity than opposite polarity appears in each 60-degree sector determined by said stator pole groups.

21. The self-starting synchronous motor of claim 20, where said rotor poles are salient poles.

22. The self-starting synchronous motor of claim 21, wherein the permanent magnet of said rotor is magnetized through its thickness whereby one face is of one polarity and the opposite face is of the opposite polarity.

23. A self-starting synchronous motor comprising
an apertured field coil,
a permanent magnet rotor positioned in said aperture of said field coil, a plurality of poles about the periphery of the permanent magnet, alternate ones of said poles being of said one polarity and the remaining poles being of the opposite polarity
a plurality of stator pole groups projecting into said aperture of said field coil and adjacent said poles of said rotor, each of said stator pole groups including at least two poles, the width of at least one of said poles being less than the width of the other stator poles in said group and
a one-way directional means including a member carried by said rotor and restraining means cooperatively associated with said member, said member and said restraining means adapted to cause said rotor to rotate in a determined direction.

24. The self-starting synchronous motor of claim 23, wherein said one-way directional means is substantially disposed in the aperture of said field coil.

25. The self-starting synchronous motor of claim 23 wherein said member includes a plurality of ribs and said restraining means includes a spring, said ribs and said spring cooperatively associated whereby rotation of said rotor in one direction is allowed and rotation of said rotor in the opposite rotor in one direction is allowed and rotation of said rotor in the opposite direction is substantially prevented.

26. The self-starting synchronous motor of claim 25, wherein said ribs extended radially and are substantially equally spaced from each other and said spring is substantially Z-shaped.

27. The self-starting synchronous motor of claim 23, further including an output shaft and speed reduction means connected to said rotor and said output shaft, said speed reduction means substantially disposed in said aperture of said field coil.

28. The self-starting synchronous motor of claim 27, wherein said speed reduction means includes a first gear concentric with said output shaft, a second gear including a different number of teeth than said first gear and carried by said output shaft, and a pinion gear meshed with said first gear and said second gear whereby said second gear rotates with respect to said first gear upon rotation of said rotor.

References Cited

UNITED STATES PATENTS

| | | | |
|---|---|---|---|
| 1,976,880 | 10/1934 | Graseby | 310—164 |
| 2,289,495 | 7/1942 | Hansen et al. | 310—164 |
| 2,951,957 | 9/1960 | Eigeman | 310—164 |
| 3,014,141 | 12/1961 | Riggs | 310—164 |
| 3,027,469 | 3/1962 | Sidell | 310—41 |
| 3,112,818 | 12/1963 | Woolley | 310—41 |

MILTON O. HIRSHFIELD, *Primary Examiner.*

L. L. SMITH, *Assistant Examiner.*

U.S. Cl. X.R.

310—41